Jan. 20, 1959  H. A. DICKISON  2,869,889
TENSION SPRING SUPPORTING MEANS FOR TRAILERS
Filed July 23, 1956  3 Sheets-Sheet 1

HARRY A. DICKISON
INVENTOR.

BY
Smith & Tuck

Jan. 20, 1959 H. A. DICKISON 2,869,889
TENSION SPRING SUPPORTING MEANS FOR TRAILERS
Filed July 23, 1956 3 Sheets-Sheet 2

HARRY A. DICKISON
INVENTOR.

BY Smith & Tuck

Jan. 20, 1959 H. A. DICKISON 2,869,889
TENSION SPRING SUPPORTING MEANS FOR TRAILERS
Filed July 23, 1956 3 Sheets-Sheet 3

HARRY A. DICKISON
*INVENTOR.*

BY *Smith & Tuck*

United States Patent Office 2,869,889
Patented Jan. 20, 1959

2,869,889

TENSION SPRING SUPPORTING MEANS FOR TRAILERS

Harry A. Dickison, Renton, Wash.

Application July 23, 1956, Serial No. 599,463

2 Claims. (Cl. 280—104.5)

This present invention relates to the general art of highway trailers of the type normally intended for hauling behind an automobile, and more particularly to a trailer of the four-wheel type wherein each wheel is independently supported by a pivoted arm and the upper ends of said pivoted arms on one side of the trailer are connected by a tension spring, thus making two tension springs provide the spring suspension of an automobile type trailer.

In recent years a great deal of thought has gone into the production of trailers normally intended for hauling behind passenger automobiles or light trucks. These trailers cover the whole range of human needs, in that they vary from the house trailer to trailers for boats and utility type trailers. Trailers of this order have now been made to a staggering total estimated at some eight million units. In constructing a trailer for this general use, it is very desirable that the trailer be kept light in weight and employ relatively small wheels, to the end that the load can be carried with the center of gravity as low as possible and the cost of the tires and wheels be kept to a minimum. In order to be successfully towed by the lighter vehicles such as passenger cars and the like, it is patricularly desirable that the trailer be kept as light as possible so that the gross weight of the trailer and its load will in turn be well within the capacity of the towing vehicle.

The spring suspension means employed on trailers covers a wide range of design, which is indicative of the fact that a preferred form has not yet been recognized, at least, and generally adopted. In adddition to producing a light trailer, it is very desirable that the cost of the trailer be kept to a minimum, and this means that simplicity as well as light weight is a dominant feature of the design that will meet the rigid requirements for this service. In my present trailer I provide a four-wheel two-axle assembly in which the wheel mounting and spring suspension means have been kept to a very lightweight structure that is simple, which does not use any elaborate spring systems that depend upon rigid brackets and mountings to keep them in the proper operating plane. In my trailer the simplest form of spring, a coil tension spring, is employed. Because of my unique design, I find it possible to use in a practical arrangement only two of these tension springs to provide the spring action for all four wheels.

The principal object of my present invention therefore is to provide a lightweight four-wheel trailer in which each wheel may be considered to have independent spring suspension.

A further object of this invention is to employ in a four-wheel trailer, two transverse axles in order that adequate transverse rigidity be provided for the wheels themselves.

A further object of this invention is to provide in a four-wheel trailer, transverse axles which are so coupled to the spring suspension means that the displacement of any one wheel normally does not affect the positioning of the bed of the trailer.

A further object of this invention is to provide that the two wheels on one side of a four-wheel trailer are joined together to a common tension spring, to the end that, when one wheel is displaced by an obstruction or depression, part of its load is automatically transferred to the other wheels, and in this way rebound is reduced to a minimum and thus more stable positioning of the bed of the trailer is achieved.

Further objects, advantages and capabilities will be apparent from the description and disclosure in the drawings, or may be comprehended or are inherent in the device.

Figure 1:
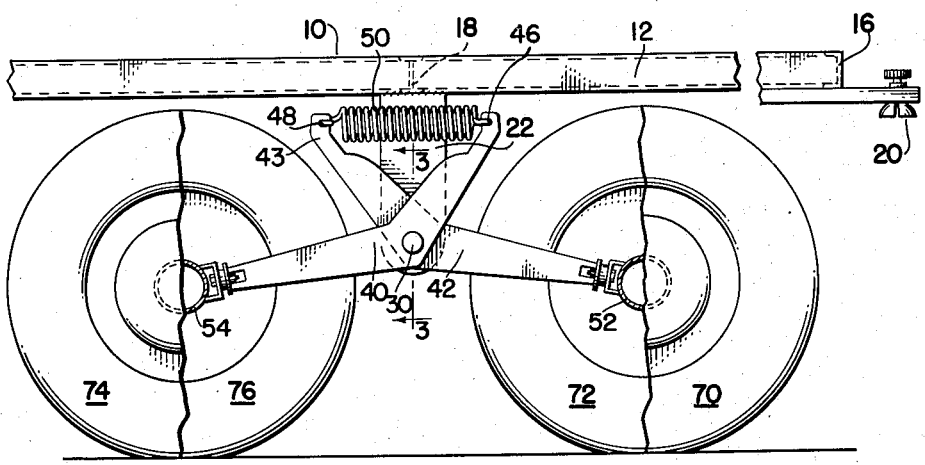
Figure 1 is a side elevation of a trailer made after the teachings of this present invention, with parts of the frame broken away and foreshortened and with one-half of each of the near wheels broken away, in order that illustration can more effectively be made. Certain parts are shown in section.

Referring more particularly to the disclosure in the drawings, the numeral 10 indicates generally the load-carrying frame of my trailer. This normally is constructed with longitudinal or side members as 12 and 14 and a plurality of transverse members as 16 and 18, normally one at each end of the frame and with additional intermediate cross members to form a rectangular marginal frame, so as to adapt the frame to the load to be carried and to provide adequate strength at the point of attachment of the spring suspension means. At its front end some form of coupling means 20 is employed in order to provide a hitching means for joining the trailer to some form of universally movable attachment on the towing vehicle. At substantially the midpoint of the load-carrying portion of frame 10 I provide first a transverse member as 18 and depending support members as 22, one on each side of the trailer, and with oppositely faced gussets as 24 and 26 disposed longitudinally of the pivot bolt 30 giving rigidity to these plate-like support members and preventing any racking of the frame when under loaded conditions.

Figure 3:
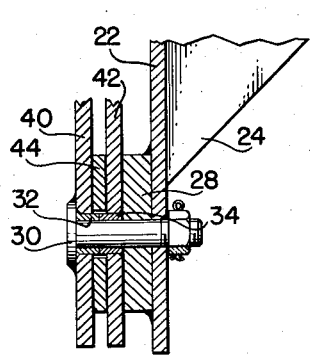
Figure 3 is a vertical cross-sectional view along the line 3—3 of Figure 1.

Each support member 22 is provided with preferably a welded-on washer 28, so as to provide a firm anchorage for pivot bolt 30. Bolt 30 is headed at one end, as indicated in Figure 3, and the headed end serves as the retaining means for bushings 32 and 34, which are disposed to turn on pin 30. Bushings 32 and 34 are inserted in the suspension arms 40 and 42, respectively. A preferred form of inserting these bushings is illustrated in Figure 3, in which the openings in members 40 and 42 are slightly countersunk on the outside surfaces, as illustrated in Figure 3, and then the bushings, having a beveled outwardly extending lip, are forced into these under pressure and this insures that the bushings will be retained in position even after considerable wear of the various parts. A free spacing washer is provided at 44 to space the two arms 40 and 42 apart, these normally working in opposite directions, and it is desired that they do not rub on each other.

Each of the four wheels of the trailer has its own suspension arm. These arms are preferably formed after the showing of Figures 1, 2, 5 and 6 and have considerable body at their midpoints and then provide a spring anchorage as at 46 and 48 for the single tension spring 50, there being one of the tension springs 50 for each coacting pair of arms.

Figure 4:
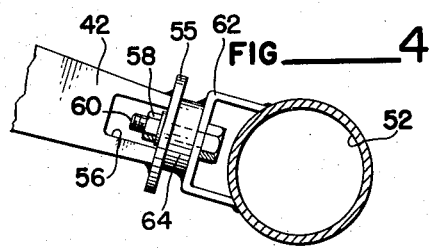
Figure 4 is a fragmentary enlarged vertical sectional view taken in the same sense as the various showings in Figures 1, 2, 5 and 6.
Figures 5, 6, 7:
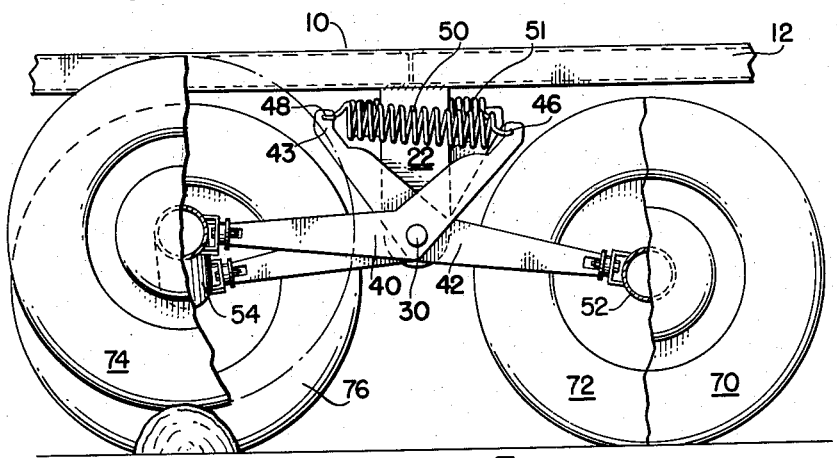
Figure 5 is a vertical view, partly in section and partly broken away, similar to Figure 2 but showing the reaction of the assemblies when the rear wheel meets an obstruction.
Figure 6 is an elevational view, partly in section, with the near wheels and tires broken away, showing the change in position of certain of the parts when one wheel engages a chuck hole or depression in the roadway.
Figure 7 is an end view of my trailer showing the displacement of one of the axles when one of its wheels rides over an obstruction.

The lower ends of arms 40 and 42 are secured to the transverse axle 52 or 54 in a manner so that the action shown in Figure 7, for instance, can be accommodated. A preferred manner of achieving this is to provide on the ends of the arms 42, referring now to Figure 4, a bearing plate as 55 and above the bearing plate a cutout or relieved portion 56 so as to accommodate, in a manner permitting adjustment of the nut 58 which provides a tightening means for bolt 60. Bolt 60 is revolvably guided within the body of bracket 62 and a welded-on washer as 64, to the end that an appreciable rotary motion of arm 42 can be achieved with respect to axle 52 or 54. Each of the arms is similarly secured to its appropriate axle. Thus, when there is need for rotary movement at this point, as on rough roads and the like, the parts are free to move in the required manner. In this connection it is desirable to point out that the arms as 40 and 42 are preferably not reinforced against lateral movement, to the end that a certain amount of resilience will be present and that will prevent binding under the distorted conditions of Figure 7, for instance.

Figure 2:
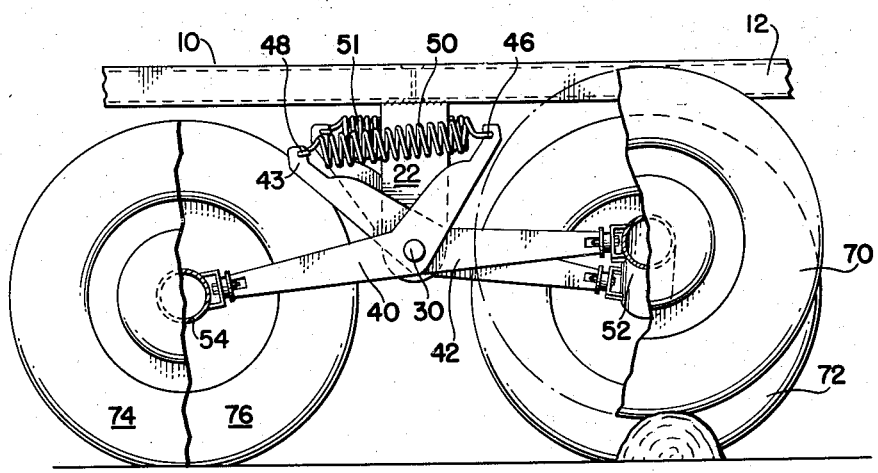
Figure 2 is a view similar to Figure 1, but showing the displacement of certain parts of the equipment when one of the wheels encounters an obstruction.

It is believed that the mode of operation of the trailer suspension means will be reasonably understood from the various views. However, it is to be noted that, when the trailer T is loaded, spring 50 will be appreciably extended so that there will be considerable space between the successive turns of the spring. Referring to Figure 2 wherein one wheel is shown as riding over an obstruction, then it will be noted that, while the distant spring as 51 is extended as in Figure 1, the near spring 50 shows considerably more extension in length and a greater spacing between successive coils. It will also be noted how the front axle as 52 is angularly disposed, due to the elevation of wheel 70, while the other wheel as 72 on the same axle is at roadway level.

In Figure 5, the view is in effect the reverse of Figure 2 and shows the effect of the rear wheel as 74 going over an obstruction, while the companion rear wheel as 76, on the same axle, is still at roadway level. Here, as before, is produced the angularly disposed position of axle 54 and spring 50 is extended, similar to Figure 2, with the far away spring 51 still extended only sufficiently to carry the load after the showing of Figure 1.

The opposite condition is where one of the near wheels, as 70, goes into a depression or chuck hole 80. This lowers the outer end of arm 42, moving the upper portion as 43 of the same arm upwardly and to the right and thus tends to compress or cause less extension in spring 50.

Figure 8:
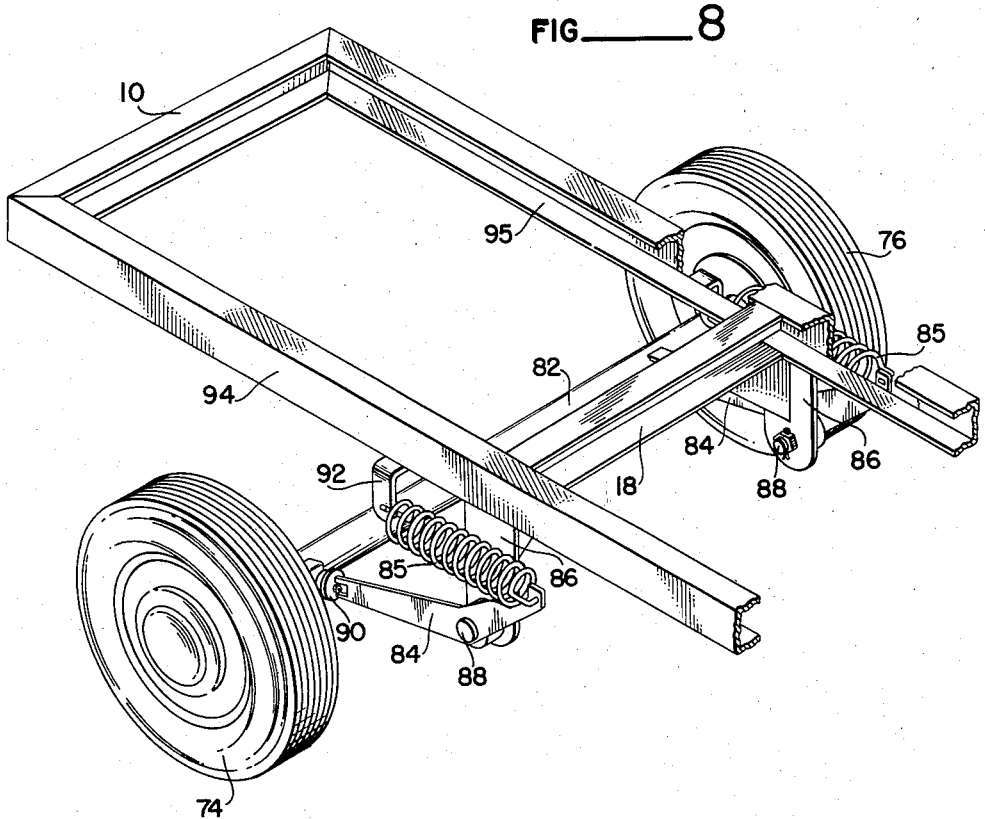
Figure 8 is a perspective view, partly in section, showing a single axle, two-wheeled trailer made after the teachings of my invention.

Referring to Figure 8, a showing is made accommodating my spring suspension means to a single axle or two-wheeled trailer. I have illustrated an assembly such as the rear axle of Figures 1 or 2; however, the front axle assembly might be used under certain conditions. The axle 82, arm 84, spring 85, hanger 86 and pivot 88 are all similar to the similar parts in the four-wheeled trailer. The swivel attachment of arm 84 to axle 82 as the unit 90 is similar also to the former construction. The only departure is where the fixed end of spring 85 is secured to a bracket 92 which is fixedly secured to frame members 94 and 95.

It is believed that it will be clearly apparent from the above description and the disclosure in the drawings that the invention comprehends a novel construction of spring supporting means for trailers.

Having thus disclosed the invention, I claim:

1. A coil spring supporting means for four-wheeled trailers, comprising: a rectangular marginal frame; a pair of coacting suspension arms pivoted intermediate their ends, each arm formed of metal plate and being of uniform thickness throughout and permitting deflection transversely of the trailer; a pivot bolt for each pair of said arms, each pivot bolt being mounted on a longitudinally disposed, depending support member formed of metal plate secured to said frame; said pair of suspension arms disposed in spaced relationship on said pivot bolt, by a disc having a diameter several times the diameter of said bolt disposed between said support member and the inner one of the suspension arms and a spacing washer of similar diameter between the inner and the outer of said suspension arms, said outer suspension arm being secured, as by welding to the head of said bolt; a bearing disposed for rotation on said bolt and adapted to revolvably support said suspension arms; a coil spring operatively engaging the upper ends of each coacting pair of said suspension arms; and means for pivotally securing the lower ends of said arms to transversely disposed wheel-positioning axles.

2. The subject matter of claim 1 in which the means for pivotally securing the lower ends of said arms comprises a bearing plate secured at right angles to the axis of the suspension arms; a bracket, having a portion parallel to said bearing plate and right angle arms secured to the axle shaft of the trailer in a manner to provide clearance for a bolt head; a bearing washer secured to said bracket and coacting with said bearing plate to provide a revolvable bearing; a bolt, axially disposed with said suspension arm to secure the revolvable bearing components together and a cut-out portion in the end of said arm to facilitate the removal of said bolt.

References Cited in the file of this patent

UNITED STATES PATENTS

| 1,085,995 | Petter | Feb. 2, 1914 |
| 1,388,405 | Clapp | Aug. 23, 1921 |
| 1,761,135 | LeMoon | June 3, 1930 |
| 2,496,428 | Avila | Feb. 7, 1950 |

FOREIGN PATENTS

| 254,215 | Great Britain | July 1, 1926 |